US010266421B1

(12) United States Patent
Mayo

(10) Patent No.: US 10,266,421 B1
(45) Date of Patent: Apr. 23, 2019

(54) POD FILTER

(71) Applicant: Roy Gene Mayo, Saint Peters, MO (US)

(72) Inventor: Roy Gene Mayo, Saint Peters, MO (US)

(73) Assignee: Sterling Filters, L.L.C., Poplar Bluff, MO (US)

( * ) Notice: Subject to any disclaimer, the term of this patent is extended or adjusted under 35 U.S.C. 154(b) by 0 days.

(21) Appl. No.: 15/211,498

(22) Filed: Jul. 15, 2016

Related U.S. Application Data

(60) Provisional application No. 62/195,086, filed on Jul. 21, 2015.

(51) Int. Cl.
*C02F 1/00* (2006.01)

(52) U.S. Cl.
CPC ........ *C02F 1/003* (2013.01); *C02F 2201/006* (2013.01); *C02F 2307/04* (2013.01)

(58) Field of Classification Search
CPC . C02F 1/003; C02F 2307/04; C02F 2201/006

USPC ....... 210/435, 439, 446, 464, 465, 469, 470, 210/473, 481
See application file for complete search history.

(56) References Cited

U.S. PATENT DOCUMENTS

| 5,424,083 | A | * | 6/1995 | Lozito | A47J 31/005 426/110 |
| 5,826,493 | A | * | 10/1998 | Tien Lin | A47J 31/02 99/299 |
| 7,926,414 | B1 | * | 4/2011 | Wolcott | A47J 31/005 210/469 |
| 2014/0027368 | A1 | * | 1/2014 | Bell | B01D 35/30 210/266 |

* cited by examiner

*Primary Examiner* — Madeline Gonzalez
(74) *Attorney, Agent, or Firm* — Vedder Price P.C.

(57) ABSTRACT

A filter for holding filtration media that may be used, for example, to filter domestic water. In one embodiment, the filter is configured to be used with a reusable cartridge and closure system enabling the use of the filter in water pitchers, including reusable gravity-flow water filters.

3 Claims, 5 Drawing Sheets

POD FILTER

RELATED APPLICATIONS

The present application claims the benefit of U.S. Provisional Application No. 62/195,086 titled FILTER POD STYLE FILTERS filed on Jul. 21, 2015.

FIELD OF THE DISCLOSURE

The present disclosure generally relates to a filter, and more particularly, to a filter that may be used, for example, with a reusable cartridge system to filter domestic water.

BACKGROUND

Various designs of portable or so-called "point-of-use" (POU) water filters are commonly used to remove contaminants from or to purify drinking water. Conventional filter designs generally include filtration media which are permanently encased within a rigid cartridge. This cartridge may be made, for example, from polypropylene that is sonically welded together to permanently encase the filtration media there within. After a maximum period of time or a maximum volume of water filtered using the filtration media, the filtration media must be replaced. Due to the construction of the rigid filter cartridge, which does not permit the filtration media to be easily accessed without damaging or destroying the cartridge, the entire cartridge must typically be discarded and replaced with a new cartridge containing new filtration media. As a result, a great deal of waste is created in replacing the filtration media. Further, the cost of replacement filtration media is significantly increased by the need for an entirely new cartridge. Further, due to the difficulty and cost required to separate the rigid cartridge from the filtration media, neither the filtration media nor the cartridge may be readily recycled. Instead, both are commonly discarded as waste, filling up landfills and causing potentially significant environmental harm.

The disadvantages of current filters outlined above, among other things, are overcome by a new design of filter that works with a removable cartridge system.

Therefore, there is a need in the art for a new design of a water filter that works with a water filter cartridge and closure system that overcomes the disadvantages of the prior art and provides the advantages as described in this disclosure. In particular, a long-felt and long-unaddressed need exists for a new design of filtration system that enables the filtration media to be replaced in a low-cost, environmentally friendly manner.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals, when found on different figures, identify the same elements or functionally equivalent elements. The elements listed in the abstract are not referenced but nevertheless refer by association to the elements of the detailed description and associated disclosure.

DETAILED DESCRIPTION

The present disclosure is not limited to the particular details of the apparatus depicted, and other modifications and applications may be contemplated. Further changes may be made in the apparatus, device or methods without departing from the true spirit and scope of the disclosure herein involved. It is intended, therefore, that the subject matter in this disclosure should be interpreted as illustrative, and not in a limiting sense.

Figure 5:
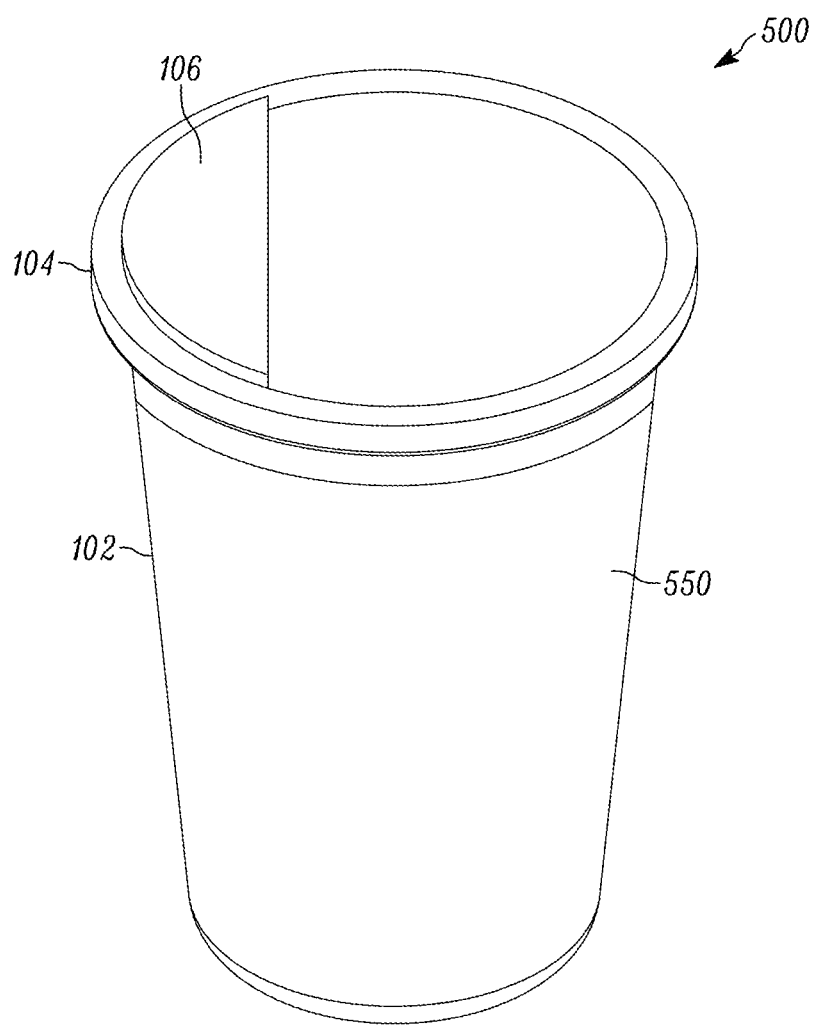
FIG. 5 is a perspective view of an assembled filter in accordance with an embodiment.
Figure 6:
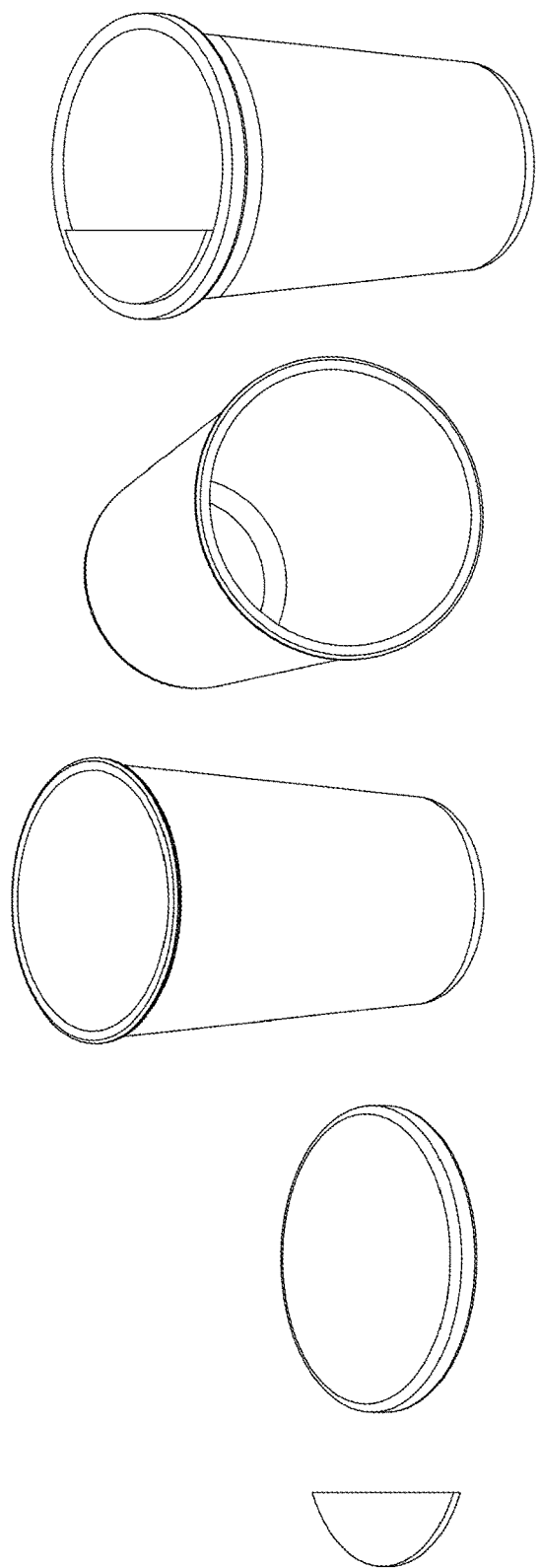
FIG. 6 is a photograph showing the embodiments depicted in FIGS. 1-5.

As shown in FIG. 5, in one aspect of the present disclosure, a filter 500 may include a cup 102, a lid 104, and a pull tab 106. In an embodiment, an interior volume of the filter 500, defined by the cup 102 and the lid 104, is hollow and is preferably filled with a filtration media 550, such as activated carbon or other suitable filtration media or any combination thereof for filtering liquid. In an embodiment, the cup 102, the lid 104, and the pull tab 106 are all preferably made from the same material. In an embodiment, this material is a non-woven polyester fabric. However, other non-woven or similar materials or fabrics may be used successfully, such as, polyester, polyethylene, polypropylene, polyvinylchloride, styrene acrylonitrile, and the like, etc. Preferably, one non-woven fabric may have a weight per given area of approximately 160 grams per square meter and is approximately ¼ inch thick before being formed into the cup 102, the lid 104, or the pull tab 106. Other examples may be within the range of [x] and [y] grams per square meter and/or [w] and [z] inches of thickness.

Figure 3A:
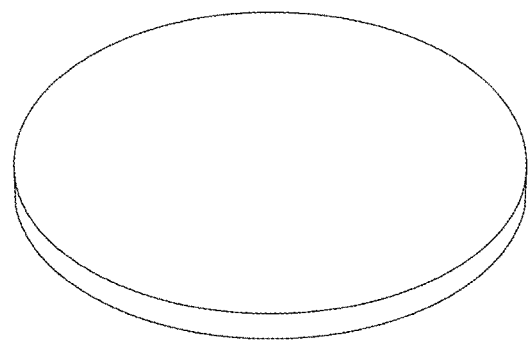
FIG. 3A is a perspective view of a precursor piece.
Figure 3B:
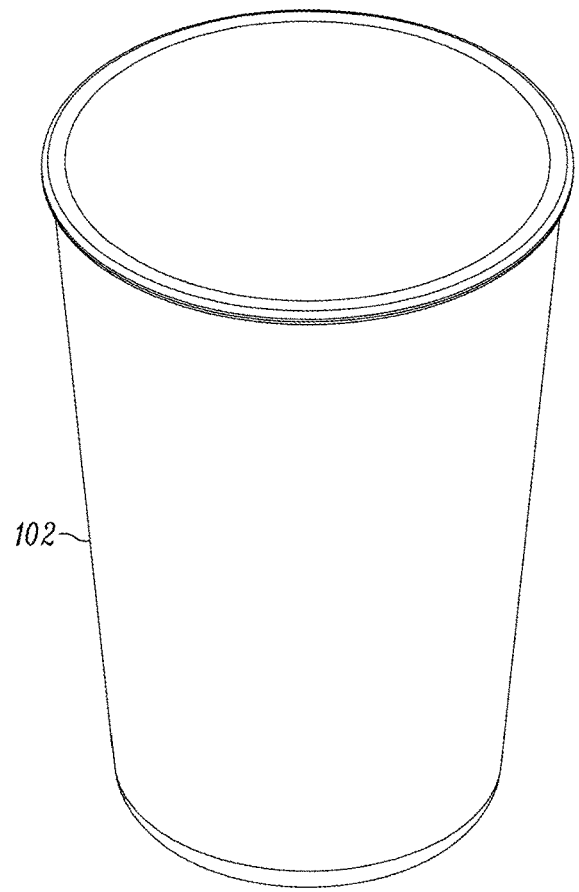
FIG. 3B is a perspective view of a cup standing vertically.
Figure 4:
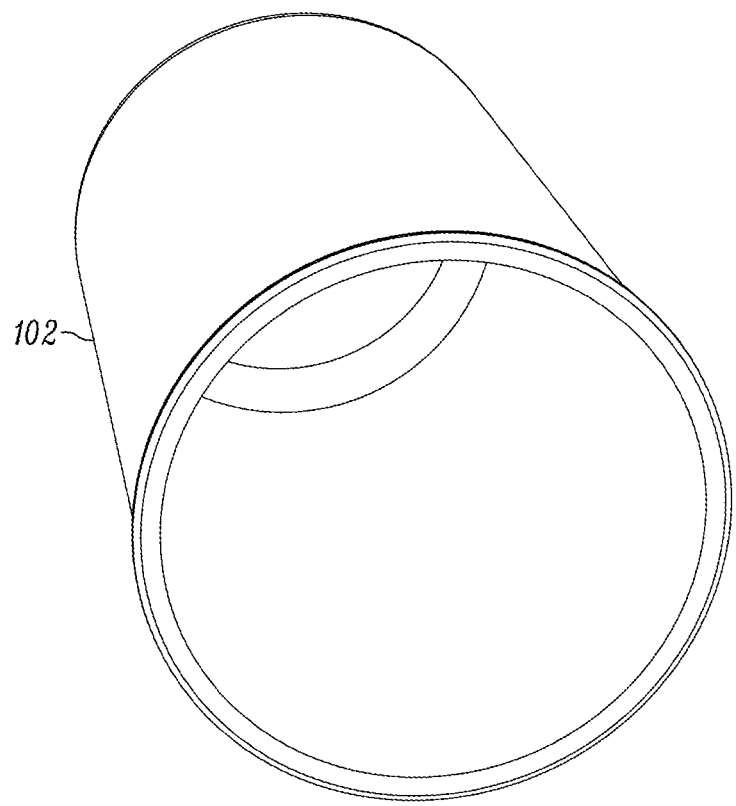
FIG. 4 is a perspective view of the cup of FIG. 3 disposed horizontally.

As shown in FIGS. 3B and 4, in an embodiment, the cup 102 is formed and configured in the shape of a cylinder with an open end. The cup 102 may be formed by thermoforming a precursor piece (see FIG. 3A) of porous non-woven fabric 300 into a desired configuration or other suitable methods that achieve the desired functionality. In one embodiment, the porosity of the fabric 300 may be in the range of approximately 50-150 microns. Preferably, the porosity of the fabric 300 will be approximately 100 microns for use in connection with water or water-like substances. The fabric 300 may be heated and pressure applied to shape the fabric 300 in a suitable mold to form a predominantly cylindrical interior cavity formed from a single wall 302, an upper flange 304 encircling the cavity and extending substantially perpendicularly away from the cylindrical wall 302 of the cavity, and a bottom portion 306 that is substantially perpendicular to the cylindrical wall 302 of the cavity and extends therebetween. By heating and applying pressure to the wall 302 via a male mold applying force to a female receptacle mold, the fabric 300 forming the wall 302 is treated, transformed, modified, processed to alter or change its structural configuration and functionality to become substantially nonporous and substantially impenetrable to liquids. In other words, water is unable to pass through the wall 302 of the cup 102. Additionally, in an embodiment, the thickness of the wall 302 is preferably reduced approximately 3-5% compared to the original thickness of the fabric 300 prior to processing. Accordingly, the volume consumed by the wall 300 is significantly reduced compared to that which would be formed by the unprocessed fabric 300. This enables the cup 102 to contain a greater volume of filtration media 550 than would otherwise be possible approximately by about 3-5%.

In an embodiment, greater heat is applied to the wall 302 than the bottom portion 306. The greater temperature reached by the wall 302 causes the wall 302 to become non-porous and impermeable to liquid. In an embodiment, the cup 102 is formed in two steps. First, the shape of the cup 102 is formed in a single thermoforming step wherein the same temperature and pressure is applied to substantially all of the precursor piece 312. Then, in the second step, a greater temperature and/or pressure are applied to only the wall 302 of the cup 102, thereby rendering the wall substantially non-porous and impermeable to liquid. Additionally, in an embodiment, the thickness of the wall 302 is reduced in the second step.

The fabric 300 forming the bottom portion 306 of the cup 102 remains porous, very nearly the same as originally configured and is water permeable nearly the same as originally configured. Accordingly, the cup 102 serves to not only contain filtration media 550, but also to permit water to enter the cavity through the open side and leave only through the bottom portion 306 rather than the wall 302. The bottom portion 306 may be formed by thermoforming the precursor piece 312 formed from the material 300 and applying a lesser pressure or temperature than that applied to the wall 302 of the cup 102. In an embodiment, the pores in the bottom portion 306 are smaller than the smallest particle of filtration media, such that the filtration media may not pass through the pores, but as large as possible so that the water may flow at a desired rate and not unnecessarily restricted by the bottom portion 306.

In an embodiment, the wall 302 of the cup 102 curves inwardly to form the bottom portion 306. As viewed in profile, the perimeter of the bottom portion 306 of the cup 102 is rounded. One of skill in the art will recognize that any other suitable method or means of manufacture may be implemented that achieves the desired structure and functionality.

Figure 2:
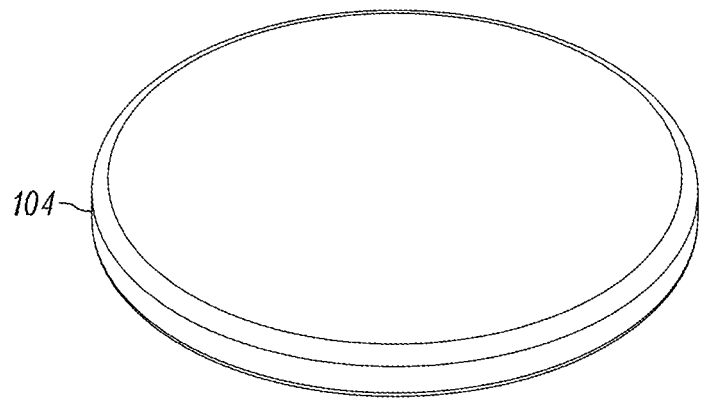
FIG. 2 is a perspective view of a lid.

As shown in FIG. 2, in an embodiment, the lid 104 is formed from the same non-woven fabric 200 as the cup 102. The lid 104 may be formed by merely cutting, forming or otherwise making a piece of flexible, formable material to a desired size (e.g., the lid is not thermoformed and is not exposed to heat or pressure to obtain the desired configuration or shape). Preferably, the lid is sized so as to be substantially equivalent in radius to the outer radius of the flange 304 of the cup 102 such that the lid 104 may be placed substantially flush on and completely overlay the flange 304 so as to seal the opening of the cavity of the cup 102 when the lid 104 is bonded to the flange 304. The lid 104 may be substantially porous and is permeable by liquids (e.g., water, etc.), such that water may flow through the lid 104 into the cavity of the cup 102 (other than the rim or outer margin thereof that is bonded to the flange 304 to seal the volume of the cup 102). In other words, the center portion of the lid 104 that is within the rim or outer margin remains as originally configured after the rim or outer margin is bonded to the flange 304. In an embodiment, these pores are smaller than the smallest particle of filtration media, such that the filtration media may not pass through the lid 104.

In an embodiment, the radius of the lid 104 may be slightly less than the radius of the flange 304, such that the flange 304 extends radially outward past the rim or outer margin of the lid 104. Generally, the perimeter of the lid 104 falls at the midway line of the flange 304 such that half of the flange 304 is covered by the lid 104 and half of the flange 304 extends past the lid 104 so that the lid 104 may be bonded to the flange 304 and the center portion of the lid 104 disposed inside the rim or outer margin for the functionality as desired.

Figure 1:
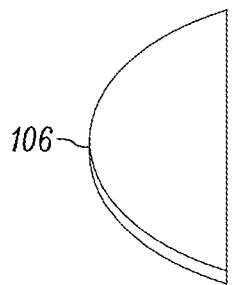
FIG. 1 is a perspective view of a pull tab.

As shown in FIG. 1, the pull tab 106 may be formed from the same non-woven fabric 200 as the cup 102 and the lid 104. In an embodiment, the pull tab 106 is formed by merely cutting, forming or otherwise making a piece of fabric to size (e.g., the pull tab 106 is not thermoformed and is not exposed to heat or pressure to obtain the desired shape). The pull tab 106 may be sized so as to have a portion that is substantially equivalent in radius to the outer radius of the flange 304 of the cup 102 and the outer radius of the lid 104 such that the pull tab 106 may be placed substantially flush on the lid 104 and bonded thereto. Preferably, the pull tab 106 (other than the rim or outer margin that overlays the lid 104 and/or flange 304) is substantially porous and is liquid permeable, such that water may flow through the pull tab 106, through the lid 104, and into the cavity of the cup 102. Generally, these pores are smaller than the smallest particle of filtration media, such that the filtration media may not pass through the pull tab 106. In an embodiment, the pull tab 106 may be configured to have a crescent shape such that it occupies a smaller area than the lid 104 but still includes a portion with the same radius as the lid 104 (for bonding thereto) but also includes another portion that is not bonded that is free to move and can be lifted by a user.

As shown in FIG. 5, in an embodiment the filter 500 is assembled by placing the lid 104 on the cup 102 such that the lid 104 is substantially aligned with the flange 304. Similarly, the pull tab 106 is placed on the lid 104 such that a portion of the pull tab 106 is substantially aligned with the lid 104. In an embodiment, the lid 104 and pull tab 106 are bonded, sealed or otherwise fixed and secured to the cup 102 by applying heat and pressure to the flange 304, the outer portion of the lid 104, and the portion of the pull tab 106 that is substantially aligned with the lid 104 and the flange 304. Accordingly, the entire filter 500 may be assembled from a single material; no adhesive or other material is used either to form any part of the filter 500 or to secure the cup 102, the lid 104, and the pull tab 106 together.

In an embodiment, a portion of the pull tab 106 is left unattached from the lid 104 such that the filter 500 may be removed from a container by pulling on the pull tab 106. Preferably, the filter 500 is sized so as to fit inside a removable and reusable filter cartridge (not shown). For example, the filter 500 may be used in the system disclosed in U.S. Patent Application No. 14/796,449 filed on Jul. 10, 2015, the disclosure of which is hereby incorporated herein by reference in its entirety, by taking the place of the filter pod disclosed in that application.

In an embodiment, the bottom portion 306 of the cup 102, the lid 104, and the pull tab 106 are comprised of a blended material. Preferably, this blended material is different than the material used to form the wall 302. For example, these elements may be comprised of a carbon impregnated fabric, zeolite impregnated fabric or other suitable or desirable filtering material.

In an embodiment, the parts of the filter 500 are formed from two or more layers of material welded together, e.g., sonically, radio frequency, etc., attached together using heat and pressure or other suitable or desirable process.

Embodiments of the filter design disclosed herein provide numerous advantages over existing filter designs. In an embodiment, the filter can contain comparable amounts of filtration media as existing designs within a smaller diameter and a smaller overall height. In other words, the embodiments of the present design may be smaller in size while containing equivalent amounts of filtration media, thereby reducing the space required for the filter and reducing the amount of material required to construct the filter. Further, due to the smaller size of the filter permitted by the present disclosure, the retail packaging may occupy a smaller footprint, which communicates ecological acumen and enables retailers to stock more filters within a given amount of shelf space. Similarly, customers may either store the same number of filters within a smaller space or store a greater number of filters within the same space.

Embodiments of the filter 500 may incorporate two particulate filters. First, the lid 104 acts as an initial particulate filter, allowing liquid to pass but preventing particles in the liquid that are larger than the pores in the lid 104 from passing into the cup 102. Next, the liquid must pass through the filtration media contained in the cup 102. Finally, the liquid must pass through the second particulate filter, which is formed from the bottom portion 306 of the cup 102. As with the first particulate filter, liquid may pass freely, while particles larger than the pores in the bottom portion 306 may not exit the cup 102. In an embodiment, multiple layers of material are used to form the lid 104 or the bottom portion 306, thereby increasing the efficacy of the particulate filters. The particulate filters serve to provide additional, independent filtration of water or other liquids that pass through the filter, beyond that provided by the filtration media alone. Further, the bottom portion 306 assists in containing the filtration media within the filter, thereby preventing the filtration media from escaping the filter into the filtered water or other liquid.

In an embodiment, less material is used to construct the filter 500 than would be required in conventional designs. Accordingly, the cost to produce the filter 500 is reduced compared to conventional designs, and the filter 500 is more environmentally friendly.

In an embodiment, the material used to construct the filter 500 is easily cut using a knife, scissors or similar tool. Accordingly, a user of the filter may easily cut through the filter 500 to extract the filtration media. The filtration media may then be disposed of separately from the material that comprises the filter 500 itself. As such, both the filtration media and the material comprising the filter 500 may be readily recycled, thereby reducing the environmental impact caused by the filter.

In an embodiment, the filter 500 is configured to be easily inserted into a removable cartridge, which is in turn configured to be placed into a larger container such as a pitcher. In an alternative embodiment, the filter 500 is configured so as to be inserted directly into a larger container, such as a pitcher. In an embodiment, the filter 500 may be readily removed from a removable cartridge or larger container merely by lifting the filter 500 out of its container using the pull tab 106.

As used herein, the term "cup" may refer generally to any structure that is sized to fit into a container (such as a water pitcher) and, as such, generally comprises one or more side walls extending in a longitudinal direction so as to create a longitudinally extending void. The term "lid" may refer generally to any structure that covers the top of a cup. For example, in one embodiment, a cup may comprise a circular base with a single cylindrical wall that is open on its top face. A corresponding lid may comprise any structure that may be placed on the open end of the cup to either partially or completely enclose an open space within the cup. In a second embodiment, the cup may comprise a rectangular structure that is open on both its top and bottom faces. In this embodiment, the corresponding lid may comprise any structure that may be placed on the open top end of the cup.

In an embodiment, the exterior of the filter 500 is substantially cylindrical in shape. The filter may comprise a top portion, a central portion, a lower portion, and a bottom surface. In an embodiment, the central portion and lower portion form the wall 302, the top portion forms the lid 104, and the bottom surface forms the bottom portion 306. In an embodiment, the top portion is substantially circular, cylindrical or similarly configured in shape. In an embodiment, the top portion is formed by joining an upper surface or lid 104 with a flange 304 protruding from the top of the central portion. Thus, the top portion may have a greater diameter than the central portion, and the wall 302 may taper from the top portion to the bottom portion.

The central portion may be slanted, tapered or otherwise configured such that the diameter at the point at which the central portion meets the top portion is greater than the diameter at the point at which the central portion meets the lower portion.

The lower portion is rounded inward from the central portion to the bottom surface. The bottom surface may comprise a flat, circular surface that is completely surrounded by the bottom surface.

One of skill in the art will recognize that all the various components identified in this disclosure may be made from any material or combination of materials suitable for the expected structural load and environment for the filter 500 including, without limitation, metals, composites, engineered plastics, natural or synthetic materials, etc. Furthermore, such components may be formed in any conventional manner, such as by molding, casting, machining, cold or hot forming, forging, etc. Still further, such components may be finished in any conventional manner, such as painting, powder coating, plating, etc., or may be unfinished.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective, based on the related art.

The invention claimed is:
1. A filter comprising:
   a cup including a wall, a bottom portion and an upper flange, wherein the cup is formed from a unitary material, the wall is substantially cylindrical, the bottom portion extends inwardly from a first end of the wall to define a bottom surface, and the upper flange extends outwardly from a second end of the wall disposed in opposition to the first end;
   a lid fixed to the upper flange so as to seal the second end;
   a pull tab attached to the lid;
   wherein a portion of the pull tab is equivalent in radius to an outer radius of the upper flange and an outer radius of the lid such that the pull tab is sized to substantially flush and bond to cover a smaller area of the lid;
   filtration media disposed within a volume of the cup defined between the wall, the bottom surface, and the lid;
   wherein the pull tab, the lid, and the bottom surface are porous and permeable by water;
   wherein the wall is non-porous and non-permeable by water; and wherein the cup, lid and pull tab are formed from a single material.

2. The filter of claim 1, wherein the single material is a non-woven fabric.

3. A method comprising:
   cutting, from a single non-woven fabric, a precursor piece, a lid and a pull tab;
   forming the precursor piece into a cup including a substantially cylindrical wall, a bottom portion extending inwardly from a first end of the wall and an upper flange extending outwardly from a second end of the wall, such that the wall is non-porous and non-permeable by water, and the bottom portion is porous and permeable by water;
   configuring a portion of the pull-tab to be substantially equivalent in radius to an outer radius of the upper flange and an outer radius of the lid;
   filling a volume defined by the cup with filtration media;
   bonding the lid to the upper flange and sizing the pull tab to substantially flush and bond to cover a smaller area of the lid, such that the lid and pull tab are porous and permeable by water.

\* \* \* \* \*